(12) United States Patent
Ciccaglione et al.

(10) Patent No.: US 8,528,168 B2
(45) Date of Patent: Sep. 10, 2013

(54) LIQUID COOLED CASTER AND WHEEL SYSTEMS

(75) Inventors: Terry M. Ciccaglione, Cold Spring, NY (US); Charles C. Gange, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 13/161,277

(22) Filed: Jun. 15, 2011

(65) Prior Publication Data
US 2012/0319455 A1 Dec. 20, 2012

(51) Int. Cl.
*B60B 33/00* (2006.01)

(52) U.S. Cl.
USPC .............................. 16/45; 16/18 R

(58) Field of Classification Search
USPC .............................. 16/18 R, 45, 46
See application file for complete search history.

(56) References Cited

U.S. PATENT DOCUMENTS

| | | | |
|---|---|---|---|
| 1,482,579 A * | 2/1924 | Nice | 16/46 |
| 2,088,442 A * | 7/1937 | Sanchez | 301/64.304 |
| 2,344,240 A | 3/1944 | Firth | |
| 2,346,805 A | 4/1944 | Whiteley | |
| 3,055,458 A * | 9/1962 | Sanford et al. | 301/6.4 |
| 3,102,608 A * | 9/1963 | Laszlo et al. | 301/36.1 |
| 5,853,227 A * | 12/1998 | Schmidt, III | 301/5.7 |
| 5,915,843 A | 6/1999 | Mattera | |
| 5,955,805 A | 9/1999 | Chaudoreille et al. | |
| 6,402,384 B1 * | 6/2002 | Bowman et al. | 301/137 |
| 6,742,932 B2 * | 6/2004 | Eisenberg et al. | 411/395 |
| 7,585,031 B2 * | 9/2009 | White et al. | 301/105.1 |
| 2007/0182241 A1 * | 8/2007 | Dombroski et al. | 301/108.1 |

FOREIGN PATENT DOCUMENTS

DE 3101581 A1 * 10/1982

* cited by examiner

*Primary Examiner* — Jeffrey O Brien
(74) *Attorney, Agent, or Firm* — Cantor Colburn LLP; Steven Chiu

(57) ABSTRACT

A liquid cooled wheel system includes a wheel, an axle bolt arranged in mechanical and supportive communication with the wheel, the axle bolt defining an internal chamber configured to hold and transmit a working fluid, a pump arranged in fluid communication with the axle bolt through the working fluid and arranged in mechanical communication with the wheel such that rotational movement of the wheel is translated into internal pumping movement of the pump, and a heat exchanger in fluid communication with both of the axle bolt and the pump and configured to exchange heat from the working fluid to an external environment.

19 Claims, 4 Drawing Sheets

LIQUID COOLED CASTER AND WHEEL SYSTEMS

BACKGROUND

The present invention relates to wheels, and more specifically, to liquid cooled caster and wheel systems.

SUMMARY

According to one embodiment of the present invention, a liquid cooled wheel system includes a wheel, an axle bolt arranged in mechanical and supportive communication with the wheel, the axle bolt defining an internal chamber configured to hold and transmit a working fluid, a pump arranged in fluid communication with the axle bolt through the working fluid and arranged in mechanical communication with the wheel such that rotational movement of the wheel is translated into internal pumping movement of the pump, and a heat exchanger in fluid communication with both of the axle bolt and the pump and configured to exchange heat from the working fluid to an external environment.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Traditionally, casters and wheel systems provide mobility and maneuverability over relatively short distances. When pressed into service over longer distances, casters and wheel systems may be prone to failure. Example embodiments of the present invention provide novel casters and wheel systems which allow for longer service through heat reduction. The technical effects and benefits of these embodiments include increased service life and decreased probability of failure.

Figure 1:
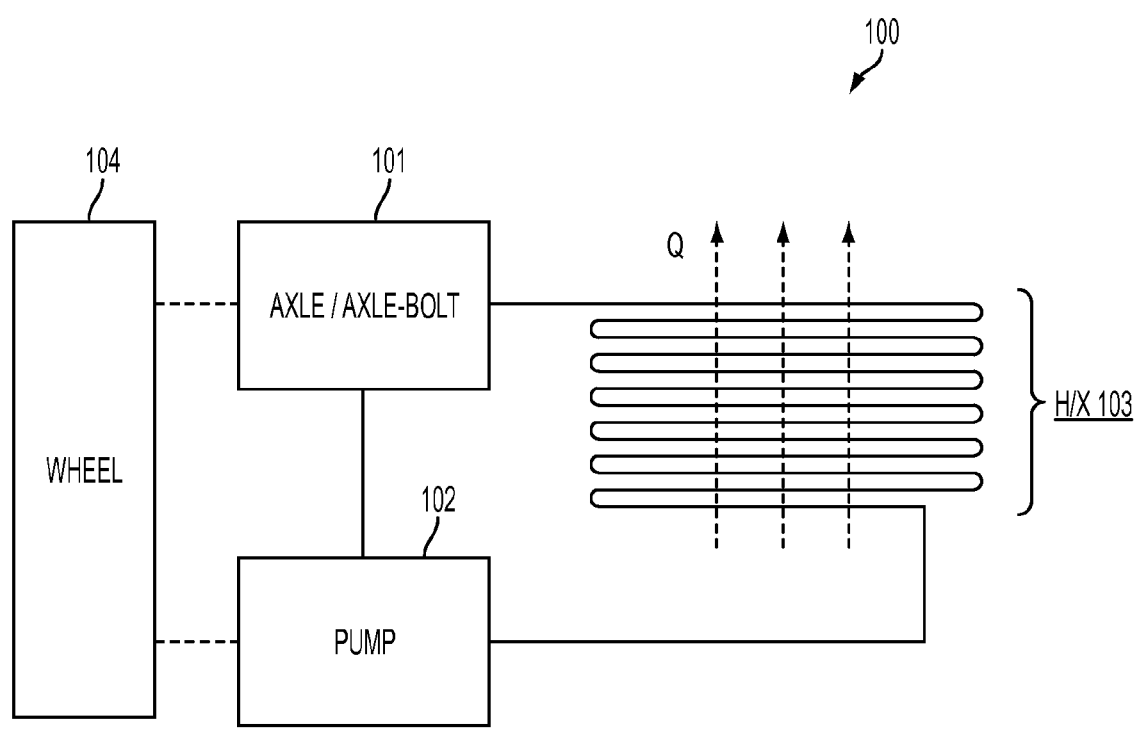
FIG. 1 illustrates a liquid cooled caster system, according to an example embodiment of the present invention.

Turning to FIG. 1, a liquid cooled caster or wheel system 100 is illustrated. The system 100 includes an axle and/or axle bolt 101. The axle bolt 101 may be any suitable bolt configured to support a wheel within a caster assembly. The axle bolt 101 may include at least one internal passage or chamber configured to allow the flow of a working fluid there-through. For example, a working fluid may include oil, water, glycol, transmission fluid, gear fluid, power steering fluid, or any suitable working fluid disposed to retain and transfer heat.

The system 100 further includes pump 102 in fluid communication with the axle bolt 101. The pump 102 may be a gear pump or other suitable pump configured to mechanically force a flow of the working fluid.

The system 100 further includes heat exchanger 103 in fluid communication with the pump 102 and the axle bolt 101, such that fluid being forced from the axle bolt 101 by the pump 102 moves through the heat exchanger 103 and back into the axle bolt 101, thereby forming a quasi-closed system. As such, an amount of heat Q may be transferred from the working fluid to a surrounding heat sink through the heat exchanger 103. For example, the heat exchanger 103 may be any suitable heat exchanger, including a finned or coiled heat exchanger configured to facilitate the exchange of heat from an internal working fluid to surrounding air or a surrounding environment.

The system 100 further includes wheel 104 in mechanical communication and supportive communication with the axle bolt 101 and in mechanical communication with the pump 102. According to an example embodiment, the axle bolt 101 supports the wheel 104 on a caster or pulley assembly. Furthermore, any turning of the wheel 104 causes movement of the pump 102 through friction. More clearly, the wheel 104 is positioned such that any motion of the wheel 104 causes the pump 102 to turn internally, causing the pump 102 to become operational. Therefore, turning of the wheel 104 may actually power the pump 102 as rotational movement of the wheel 104 is translated into internal pumping movement of the pump 102.

It follows then, that as the wheel 104 turns, heat caused by friction of the wheel 104 against a caster/pulley assembly and/or axle bolt 101 may be transferred away through the working fluid by operation of the pump 102 and heat exchanger 103.

Figure 2:
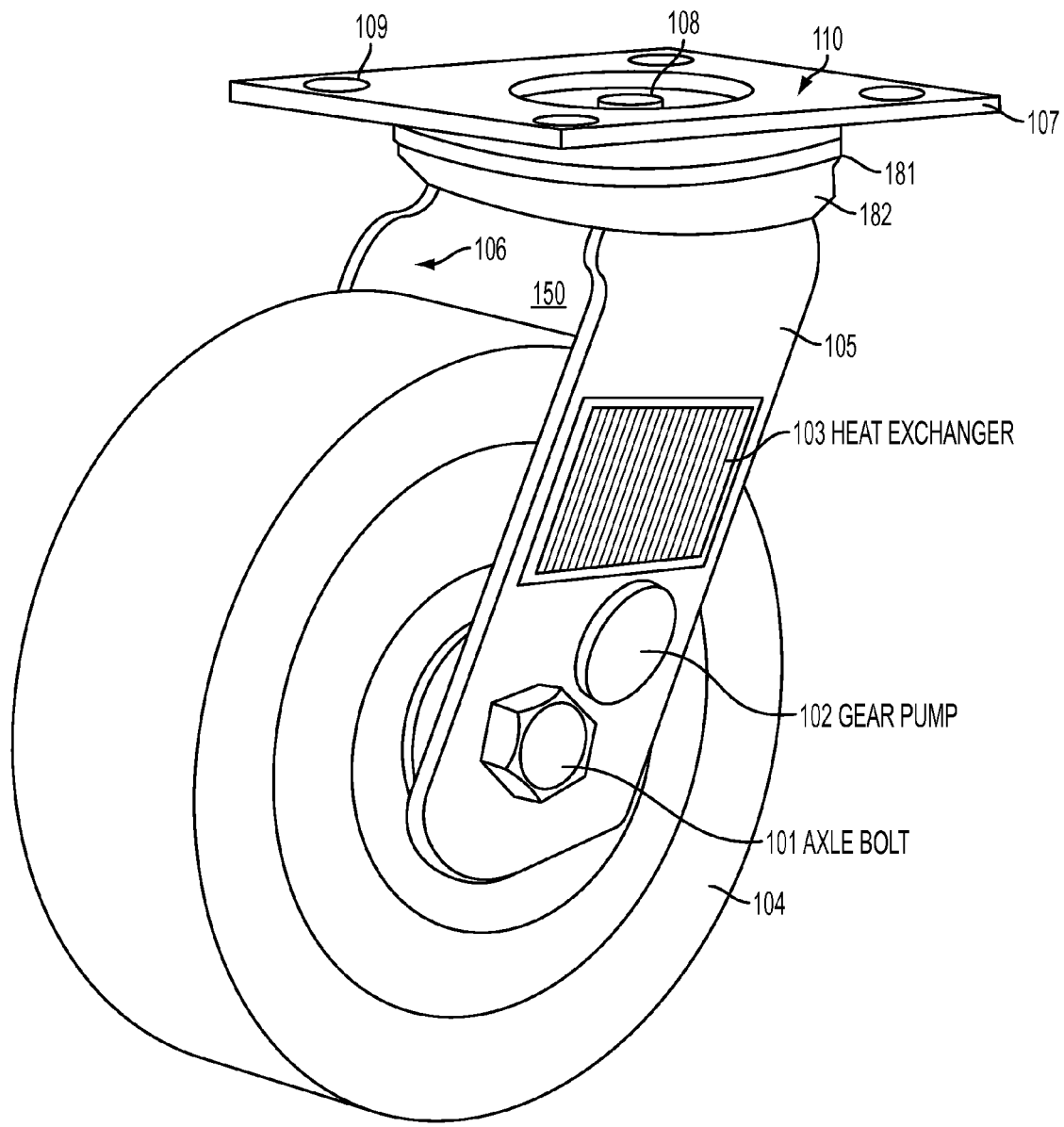
FIG. 2 illustrates a liquid cooled caster system, according to an example embodiment of the present invention.

Turning now to FIG. 2, a more detailed illustration of the system 100 is provided. According to FIG. 2, the system 100 includes a caster assembly 110. The caster assembly 110 includes an attachment base 107. The attachment base 107 may include a plurality of mounting through-holes 109 configured to allow screws or other attachment means to travel there-through, for example, when installing the system 100 onto a table or chair.

The system 100 further includes a first swivel plate 181 arranged on the attachment base 107 and a second swivel plate 182 in mechanical communication with the first swivel plate 181. As arranged, the first swivel plate 181 and the second swivel plate 182 may allow rotational movement there-between, for example, swivel movement.

The system 100 further includes a first yoke 105 arranged on the second swivel plate 182 and a second yoke 106 arranged on the second swivel plate 182 opposite and separate the first yoke 105. The first yoke 105, the second yoke 106, and the second swivel plate 182 define a channel 152 wherein the wheel 104 is supported using the axle bolt 101, allowing for a rotational swivel motion of the wheel 104 there-through with respect to the attachment base 107.

As further illustrated, the heat exchanger 103 may be arranged on the first yoke 105 proximate the pump 102. Furthermore, the pump 102 may be arranged proximate the wheel 104 to allow for transfer of motion to power the pump 102. Although not illustrated, it should be understood that fluid channels allowing for fluid flow between an internal chamber of the axle bolt 101, the gear pump 102, and the heat exchanger 103 may also be arranged on, within, or partially within the first yoke 105.

Figure 3:
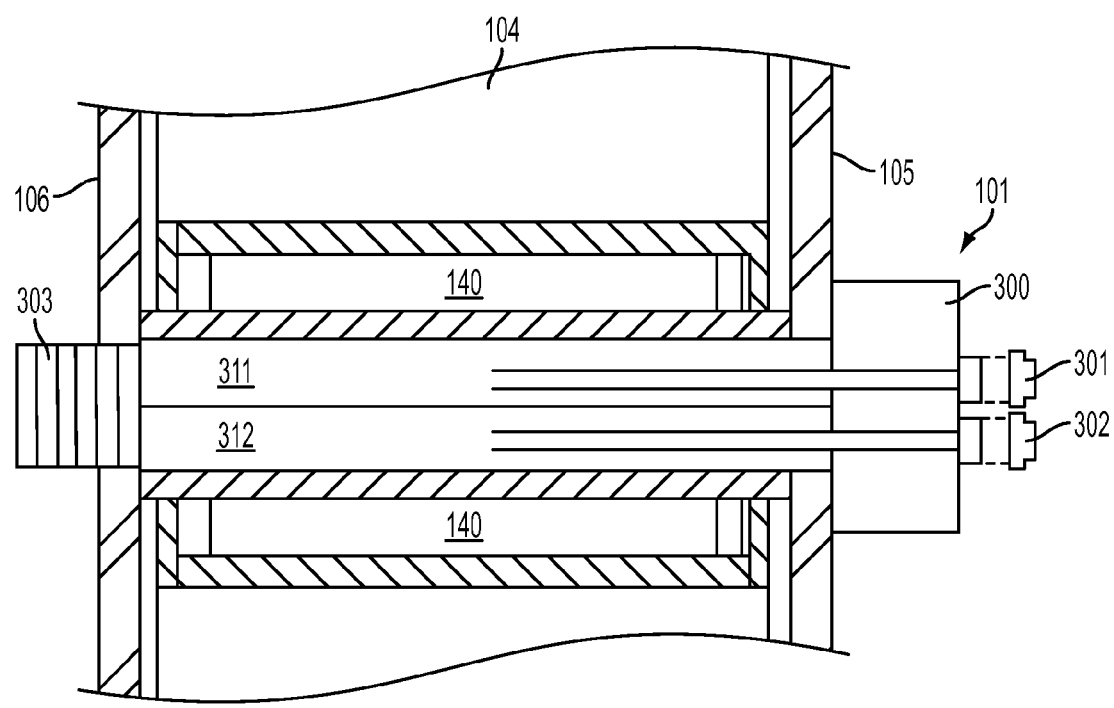
FIG. 3 illustrates a cut-away view of a liquid cooled caster system, according to an example embodiment of the present invention.

Turning to FIG. 3, a cut-away view of a portion of system 100 is provided. As illustrated, the wheel 104 may include a bearing portion or void 140 disposed there-through, configured to receive the axle bolt 101. The axle bolt 101 may be arranged through the first yoke 105 and the bearing portion 140 of wheel 104, and may be threaded into the second yoke 106 using threads 303.

The axle bolt 101 may include a retention head 300 disparate the threads 303, configured to allow tightening or torquing of the axle bolt against the first yoke 105. The axle bolt 101 may further include a first port 301 and a second port 302 arranged on the retention head 300. The first port 301 may be in fluid communication with a first portion 311 of an internal chamber of the axle bolt 101. The second port 302 may be in fluid communication with a second portion 312 of the internal chamber of the axle bolt 101. Therefore, a working fluid may pass from the first port 301 to the first portion 311, from the first portion 311 of the internal chamber to the second portion 312 of the internal chamber, and from the second portion 312 of the internal chamber to the second port 302. In this manner, a working fluid may flow through the axle bolt 101 to exchange heat with the bearing portion 140. The ports 301 and 302 may be used to transfer the working fluid to/from the axle bolt 101 to/from the pump 102 and heat exchanger 103.

Figure 4:
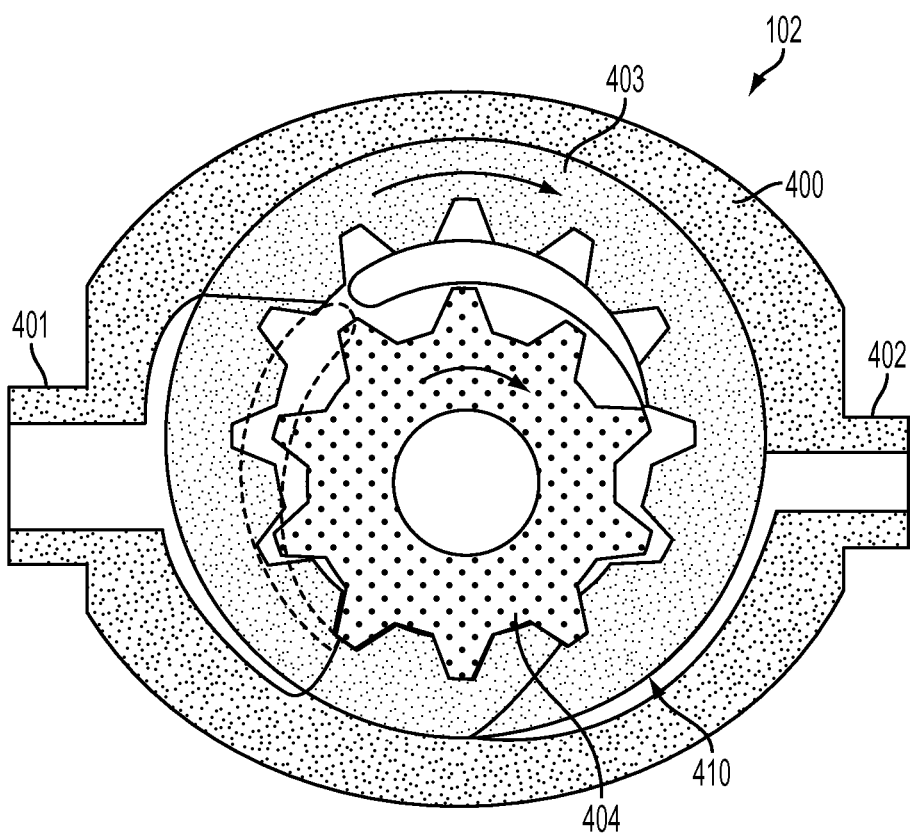
FIG. 4 illustrates a gear pump apparatus of a liquid cooled caster system, according to an example embodiment of the present invention.

Turning now to FIG. 4, a cut-away view of an interior of the pump 102 is illustrated. According to at least one example embodiment, the pump 102 includes a housing 400 defining an inner cavity 410 internal to the pump 102. The inner cavity 410 may be entirely surrounded by the housing 400. The housing 400 may also define an inlet port 401 and an outlet port 402 disposed to allow a working fluid to enter and exit the inner cavity 410.

The pump 102 may further include a primary outer pump gear 403 arranged within the inner cavity 410. The primary outer pump gear 403 defines a primary axis of rotation. The pump 102 may further include a secondary inner pump gear 404 arranged within the primary outer pump gear 403. The secondary inner pump gear 404 defines a secondary axis of rotation which is not collinear with the primary axis of rotation (e.g., off-center). Both the primary outer pump gear 403 and the secondary inner pump gear 404 are configured to rotate out of sync based upon a ratio of gear teeth arranged thereon according to a Gerotor arrangement. Thus, the pump 102 may provide positive displacement of fluid from the inlet port 401 to the outlet port 402 based upon relative sizes of each of the primary outer pump gear 403 and the secondary inner pump gear 404 (e.g., as a positive displacement gear pump).

It should be noted that although particularly illustrated as a positive or fixed displacement gear pump according to a Gerotor gear pump arrangement, the same may be varied without departing from the scope of example embodiments. For example, any pump suitable for translating rotational movement of the wheel 104 into fluid motion of a working fluid may also be applicable. Therefore, example embodiments should not be limited to the particular pump arrangement illustrated.

Furthermore, it should be noted that although particularly illustrated as a caster assembly, the same may also be varied in many ways. For example, the caster wheel illustrated may also be extensible to pulley wheels within pulley assemblies. Thus, rotational movement of a pulley wheel may be translated into fluid motion of a working fluid, thereby transferring heat from a bearing portion of a pulley assembly to a heat exchanger. Another variant may be applied to wheel and brake systems that are subject to high load (e.g., brake systems on airplanes) and the dissipation of heat is a critical feature to improve braking performance. Many other alternatives are also considered to be equally applicable to example embodiments, including any assembly comprising at least a wheel, axle bolt, pump, and heat exchanger arranged to transfer heat through a working fluid.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A liquid cooled wheel system, comprising:
    a wheel;
    an axle bolt arranged in mechanical and supportive communication with the wheel, the axle bolt defining an internal chamber configured to hold and transmit a working fluid;
    a pump arranged in fluid communication with the axle bolt through the working fluid and arranged in mechanical communication with the wheel such that rotational movement of the wheel is translated into internal pumping movement of the pump; and
    a heat exchanger in fluid communication with both of the axle bolt and the pump and configured to exchange heat from the working fluid to an external environment.

2. The system of claim 1, wherein the wheel is a caster wheel.

3. The system of claim 1, further comprising a caster assembly.

4. The system of claim 3, wherein the caster assembly comprises:
    an attachment base;
    a first swivel plate arranged on the attachment base; and
    a second swivel plate in mechanical communication with the first swivel plate, wherein the axle bolt is arranged to support the wheel on the second swivel plate.

5. The system of claim 3, wherein the caster assembly comprises:
    an attachment base;

a first swivel plate arranged on the attachment base;

a second swivel plate in mechanical communication with the first swivel plate;

a first yoke arranged on the second swivel plate; and a second yoke arranged on the second swivel plate separate the first yoke.

6. The system of claim 5, wherein the first yoke, the second swivel plate, and the second yoke define a channel arranged to allow rotational movement of the wheel there-through.

7. The system of claim 5, wherein the heat exchanger is arranged on the first yoke.

8. The system of claim 5, wherein the pump is arranged on the second yoke.

9. The system of claim 1, wherein the axle bolt comprises:

a first port in fluid communication with the internal chamber configured to allow the working fluid to flow there-through.

10. The system of claim 9, wherein the axle bolt further comprises:

a second port in fluid communication with the internal chamber configured to allow the working fluid to pass there-through.

11. The system of claim 10, wherein:

the first port is in fluid communication with the pump; and the second port is in fluid communication with the heat exchanger.

12. The system of claim 1, wherein the pump is a gear pump.

13. The system of claim 12, wherein the gear pump is arranged as a Gerotor gear pump.

14. The system of claim 12, wherein the gear pump comprises:

a housing defining an inner cavity internal to the gear pump.

15. The system of claim 14, wherein the housing further defines:

an inlet port in fluid communication with the inner cavity; and an outlet port in fluid communication with the inner cavity.

16. The system of claim 15, wherein the inlet port is in fluid communication with the axle bolt and the outlet port is in fluid communication with the heat exchanger.

17. The system of claim 14, wherein the gear pump comprises:

a primary outer pump gear arranged within the inner cavity defining a primary axis of rotation; and a secondary inner pump gear arranged within the primary outer pump gear defining a secondary axis of rotation not collinear with the primary axis of rotation.

18. The system of claim 14, wherein the gear pump is a positive displacement gear pump.

19. The system of claim 1, wherein the wheel is a pulley wheel.

* * * * *